9/13/77 OR 4,047,804

United States Patent [19]

Stephens

[11] 4,047,804

[45] Sept. 13, 1977

[54] ANTI-REFLECTION COATINGS FOR PHOTOGRAPHIC BASES

[75] Inventor: Robert K. Stephens, Windham, N.H.

[73] Assignee: Polaroid Corporation, Cambridge, Mass.

[21] Appl. No.: 528,236

[22] Filed: Nov. 29, 1974

Related U.S. Application Data

[63] Continuation of Ser. No. 428,400, Dec. 26, 1973, abandoned.

[51] Int. Cl.[2] .......... B32B 7/02; B32B 27/00

[52] U.S. Cl. .......... 350/164; 96/87 R; 260/827; 428/331; 428/333; 428/336; 428/339; 428/421; 428/422; 428/483

[58] Field of Search .......... 96/67, 84 R, 87 R; 350/164, 165, 166; 260/29.1 SB, 827; 428/212, 213, 215, 333, 336, 339, 421, 422, 483, 331

[56] References Cited

U.S. PATENT DOCUMENTS

| | | | |
|---|---|---|---|
| 2,644,802 | 7/1953 | Lontz | 260/29.1 SB |
| 2,940,947 | 6/1960 | Welch et al. | 260/29.1 SB |
| 3,062,764 | 11/1962 | Osdal | 260/827 |
| 3,391,221 | 7/1968 | Gore et al. | 260/827 |
| 3,476,827 | 11/1969 | Engelhardt | 260/825 |
| 3,686,356 | 8/1972 | Saam | 260/827 |
| 3,793,022 | 2/1974 | Land et al. | 96/84 R |
| 3,833,368 | 9/1974 | Land et al. | 96/87 R |

*Primary Examiner*—George F. Lesmes
*Assistant Examiner*—P. S. Thibodeau
*Attorney, Agent, or Firm*—Stanley H. Mervis

[57] ABSTRACT

Transparent elements useful as supports for photographic image-carrying and/or image-recording layers are provided comprising a polymeric film base having an anti-reflection coating on one surface. Image-carrying and/or image-recording layers may be coated on the opposed surface. Such transparent supports are particularly useful in photographic products wherein the final image is formed by multicolor diffusion transfer processes using dye developers or other image dye-providing materials. In the preferred embodiments, the photographic image is an integral negative-positive reflection print. Where photoexposure is effected through a transparent support, e.g., the transparent support through which the final image is viewed, provision of an anti-reflection coating on said support and effecting photo-exposure therethrough will permit more effective recording of light passing through the camera lens.

The polymeric film base of the transparent element has an index of refraction of at least 1.6, and the anti-reflection coating comprises a fluorinated polymer and has an optical thickness of a quarter wave. More uniform anti-reflection coatings are obtained by including a polydimethyl siloxane in the fluorinated polymer coating solution.

22 Claims, 4 Drawing Figures

ANTI-REFLECTION COATINGS FOR PHOTOGRAPHIC BASES

This application is a continuation of copending application, Ser. No. 428,400 filed Dec. 26, 1973 (now abandoned).

This invention is concerned with photography and, more particularly, with the provision of transparent sheet-like elements particularly useful as supports for photographic image-carrying and/or image-recording layers, said transparent elements having an anti-reflection coating on the surface thereof opposite the surface adapted to carry said layer(s).

A number of photographic processes have been proposed wherein the resulting photograph comprises the developed silver halide emulsion(s) retained as part of a permanent laminate, with the desired image being viewed through a transparent support. Of particular significance are those processes where the image is in color and is formed by a diffusion transfer process. If the image is to be viewed as a reflection print, the image-carrying layer is separated from the developed silver halide emulsion(s) in said laminate by a light-reflecting layer, preferably a layer containing titanium dioxide. Illustrative of patents describing such products and processes are U.S. Pat. No. 2,983,606 issued Mar. 9, 1961 to Howard G. Rogers, U.S. Pat. Nos. 3,415,644, 3,415,645 and 3,415,646 issued Dec. 10, 1968 to Edwin H. Land, U.S. Pat. Nos. 3,594,164 and 3,594,165 issued July 20, 1971 to Howard G. Rogers, and U.S. Pat. No. 3,647,347 issued Mar. 7, 1972 to Edwin H. Land.

Referring more specifically to the aforementioned U.S. Pat. No. 3,415,644, said patent discloses photographic products and processes employing dye developers wherein a photosensitive element and an image-receiving layer are maintained in fixed relationship prior to photoexposure and this fixed relationship is maintained after processing and image formation to provide a laminate including the processed silver halide emulsions and the image-receiving layer. Photoexposure is made through a transparent (support) element and application of a processing composition provides a layer of light-reflecting material to provide a white background for viewing the image and to mask the developed silver halide emulsions. The desired color transfer image is viewed through said transparent support against said white background.

While such processes provide very useful and good quality images, it has been found that the full potential quality of the image is not obtained because the transparent support through which the image is viewed in fact reflects "white" light to the viewer's eyes. Furthermore, this property of reflecting some of the light incident on the surface of the transparent support adversely affects the ability of the film to record a subject when photoexposure is effected through such a transparent support.

As disclosed and claimed in the copending application Ser. No. 276,979, filed Aug. 1, 1972 in the names of Edwin H. Land, Stanley M. Bloom and Howard G. Rogers, (now U.S. Pat. No. 3,793,022 issued Feb. 19, 1974), and in Ser. No. 428,368 filed Dec. 26, 1973, now abandoned as a continuation-in-part of said Ser. No. 276,979, such undesired surface reflection may be avoided by the provision of an anti-reflection coating positioned as taught in said application.

It is a primary object of this invention to provide novel transparent sheetlike elements useful as supports for image-carrying and/or image-receiving layers, said transparent sheetlike elements including a polymeric film base carrying an improved anti-reflection coating comprising a fluorinated polymer and including a polydimethyl siloxane.

It is a further object of this invention to provide transparent supports for diffusion transfer images, particularly multicolor transfer images, the outer surface of said transparent support carrying an improved anti-reflection coating of a fluorinated polymer and including a polydimethyl siloxane.

Yet another object of this invention is to provide transparent supports for photographic films which are exposed through a transparent support, the outer surface of said transparent support carrying an improved anti-reflection coating of a fluorinated polymer and including a polydimethyl siloxane.

Other objects of this invention will in part be obvious and will in part appear hereinafter.

The invention accordingly comprises the product possessing the features, properties and relation of components and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description of the invention taken in conjunction with the accompanying drawings wherein.

Figure 1:
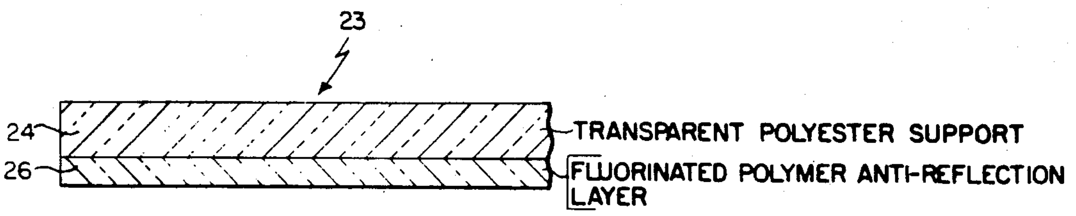
FIG. 1 is a diagrammatic, enlarged cross-sectional view of a transparent support carrying an anti-reflection coating in accordance with this invention.

As noted above, this invention is particularly concerned with color diffusion transfer processes wherein the layer containing the diffusion transfer image, i.e., the image-receiving layer, is not separated from the developed photosensitive layers after processing but both components are retained together as part of a permanent laminate. Film units particularly adapted to provide such diffusion transfer images have frequently been referred to as "integral negative-positive" film units. The resulting image may be referred to as an "integral negative-positive reflection print" and as so used this expression is intended to refer to a reflection print wherein the developed photosensitive layers have not been separated from the image layer, i.e., the layer containing the transfer dye image. A light-reflecting layer between the developed photosensitive layer(s) and the image layer provides a white background for the dye image and masks the developed photosensitive layer(s). These layers are part of a permanent laminate which usually includes dimensionally stable outer or support layers, the transfer dye image being viewable through one of said supports. This invention is particularly concerned with providing improved anti-reflection coatings particularly useful for improving the aesthetic qualities of such integral negative-positive reflection prints.

The transparent elements (supports) of the present invention are applicable to a wide variety of photographic films. The arrangement and order of the individual layers of such films may vary in many ways as is known in the art. For convenience, however, the more specific descriptions of the invention hereinafter set forth may be by use of dye developer diffusion transfer color processes and of integral negative-positive film units of the type contemplated in the previously mentioned patents, particularly U.S. Pat. Nos. 3,415,644 and 3,594,164. It will be readily apparent from such descriptions that other image-forming reagents may be used, e.g., color couplers, coupling dyes or dyes (couplers) which release a dye or dye intermediate as a result of coupling or oxidation.

When such integral negative-positive reflection prints are viewed under ordinary lighting conditions, a small but significant amount of light is reflected from the external surface of the transparent support. The effect of this reflection of incident light is to limit the clarity with which the image may be seen except when the viewer's eyes are "just right", i.e., good viewing may be highly directional, in that the print may have to be "tilted" with respect to the viewer's line of vision to avoid obscuring image detail. This problem becomes more acute when several persons try to view the same image, as those not directly in front of the print will experience substantial glare, with the amount of glare increasing as the angle of view becomes more oblique. In addition, the color(s) of a color image may appear less saturated.

If photoexposure is effected through such a transparent support, reflection of light from the surface of the transparent support has been found to have several undesirable results. One result is a reduction in the exposure index or "speed" of the film, due to the fact that some of the light which has passed through the camera lens will be reflected before it can reach the photosensitive layer(s) and the thus reflected light will not participate in the recording of the photographed subject matter. Furthermore, such reflected light has a tendency to "bounce" within the camera, and may cause flare and reduced contrast and resolution in the final image. If photoexposure is effected through the transparent support in a camera which includes an image-reversing mirror in the optical path, light reflected from the surface may cause a "ghost" image of a particularly bright object within the scene to be superposed on another portion of the scene in the resulting photograph.

As noted above, copending application Ser. No. 276,979 teaches that such undesirable reflection from the transparent support may be substantially reduced, if not completely eliminated, by modifying the external surface of such transparent supports so as to provide a controlled change in the index of refraction to which incident light is subjected as it passes from air into the transparent support. The present application is concerned with the provision of transparent elements of a high index polymeric film base and including an anti-reflection layer containing a fluorinated polymer and a polydimethyl siloxane, which elements are particularly useful in the practice of the invention described and claimed in said Ser. No. 276,979.

The principles of physics by which anti-reflection coatings function are well known and may be used to special advantage in the present invention. Thus, it is well known that application of a single layer transparent coating will reduce surface reflection from a transparent layer (support) if the refractive index of said coating is less than that of the transparent layer to which it is applied and the coating is of appropriate optical thickness. In the photographic products with which this invention is concerned, the anti-reflection coating will normally be in optical contact with air. Under these circumstances, and because the index of refraction of air is 1, the applicable principles of physics give the following rule: if the index of refraction of the coating material (anti-reflection layer) is exactly equal to the square root of the index of refraction of the substrate (transparent support), then all surface reflection of light will be eliminated for that wavelength at which the product of the refractive index times thickness is equal to one-quarter of that wavelength. At other wavelengths the destructive interference between light reflected from the top and bottom surfaces of the anti-reflection coating is not complete but a substantial reduction in overall reflectivity is obtained. By selecting the optical thickness of the anti-reflection coating to be one-quarter of a wavelength for approximately the mid-point of the visible light wavelength range (i.e., one-quarter of 5500 Angstroms or about 1400 Angstrom), the reduction in reflectivity is optimized. The term "optical thickness" as used herein refers to the product of the physical thickness of the coating times the refractive index of the coating material.

The anti-reflection coating should be optically clear and provide an essentially uniform layer. In certain embodiments of this invention, the anti-reflection coating is also effective as an anti-abrasion coating, since it is preferably more scratch resistant than the support. Illustrative examples of useful anti-reflection coatings and their method of application will be described hereinafter.

Transparent support elements of this invention comprise polyesters, polystyrene, polycarbonates, and similar art known polymeric film base materials having an index of refraction of at least 1.6. Such film bases typically have a thickness of about 2 to 10 mils (0.002 to 0.010 inch). Particularly useful polyester film bases have a thickness of about 2 to 6 mils. Polyester and polystyrene films have higher refractive indices than cellulose acetate, and the resultant greater incidence of surface reflected light as compared with cellulose acetate would normally be considered to be a disadvantage of using such materials in integral negative-positive reflection or other prints in which the image is viewed through a transparent base. (Indeed, the greater surface reflection resulting in greater glare, and the resultant need for more directional viewing, exhibited by polyester films as compared with cellulose acetate is well known from the commonly used protective transparent covers for notebook pages.) These higher indices of refraction are turned into an advantage by the present invention, for the high index of refraction makes it much more possible to provide anti-reflection coatings which practically eliminate all reflectivity, whereas reflectivity can only be reduced when using cellulose acetate.

Particularly useful transparent supports are films of polyethylene terephthalate, such as those commercially available under the trademarks "Mylar" (E. I. DuPont de Nemours & Co.) and "Estar" (Eastman Kodak Co.). Such polyester films have an index of refraction on the order of about 1.66. A number of fluorinated polymes are particularly useful as anti-reflection coatings since they have indices of refraction quite close to the 1.29 ideal of index of refraction, i.e., the geometric mean of the indices of refraction of the polyethylene terephthalate and the surrounding air, or, because of the index of refraction of air is 1, the square root of the 1.66 index of refraction of polyethylene terephthalate. Furthermore, the fact that the difference of about 0.3 in the indices of refraction between air and the anti-reflection coating is close to the approximate 0.3 difference in the indices of refraction of the anti-reflection coating and the polyethylene terephthalate support means that maximum benefit will be obtained from the anti-reflection coating; the amplitude of the light entering the anti-reflection coating will more closely match the amplitude of the light reflected back from the interface of the polyethylene terephthalate and the anti-reflection coating, and more effectively cancel out the thus-reflected light.

Figure 2:
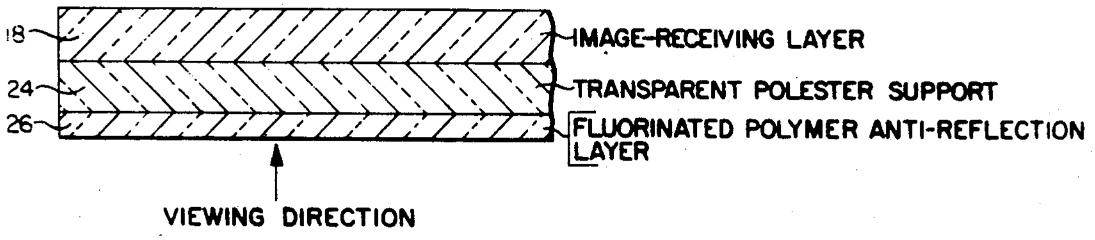
FIGS. 2 and 3 are diagrammatic, enlarged cross-sectional view of the transparent support of FIG. 1 carrying, respectively, an image-receiving layer and a silver halide emulsion layer.
Figure 3:
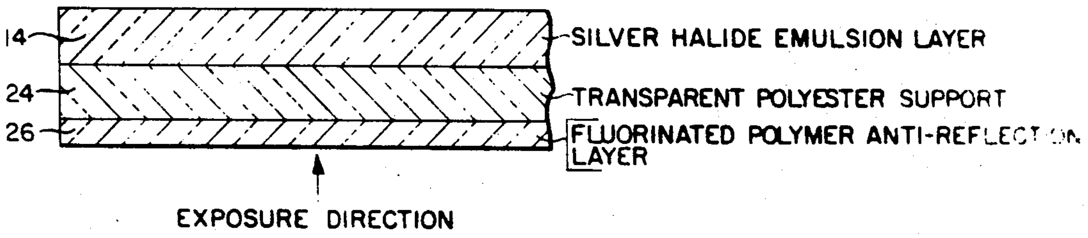

Reference is now made to the accompanying drawings wherein like numbers, appearing in the various figures, refer to like components. In FIG. 1, there is shown a transparent element 23 comprising a transparent polyester film base or support 24 carrying on one surface a florinated polymer anti-reflection layer or coating 26. In FIG. 2, such a transparent element is shown carrying an image-receiving layer 18, while in FIG. 3 a silver halide emulsion layer 14 is carried by the transparent element.

Figure 4:
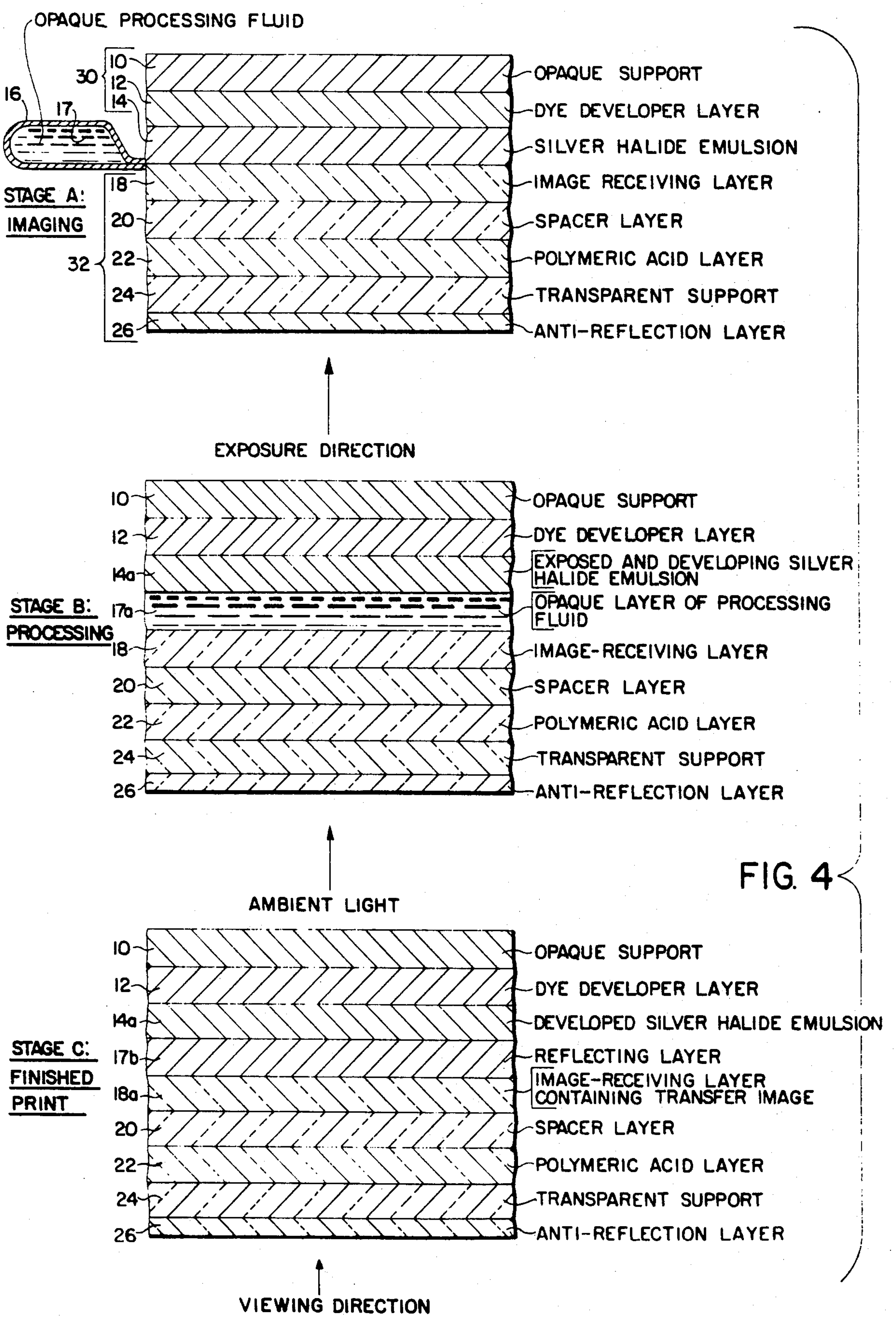
FIG. 4 is a diagrammatic, enlarged cross-sectional view of a diffusion transfer film unit embodying a transparent support of the present invention, illustrating the arrangement of layers during the three illustrated stages of a monochrome diffusion transfer process, i.e., exposure, processing and final image.

For ease of understanding, FIG. 4 illustrates the formation of a monochrome image using a single dye developer. The illustrated embodiment includes appropriate means of opacification to permit the processing of the film unit outside of a dark chamber, i.e., the film unit is intended to be removed from the camera prior to image completion and while the film is still photosensitive. Opacifying systems are described in the previously noted patents and per se form no part of the present invention which is equally useful with film units intended to be processed in the dark. A particularly useful opacifying system for film units of the type shown in FIG. 4 utilizes a color dischargeable reagent, preferably a pH-sensitive optical filter agent or dye, sometimes referred to as an indicator dye, as is described in detail in the aforementioned U.S. Pat. No. 3,647,437.

Referring to FIG. 4, Stages A, B and C show in diagrammatic cross-section, respectively, imaging, processing, and the finished print. In Stage A, there is shown a photosensitive element 30 in superposed relationship with an image-receiving element 32, with a rupturable container 16 (holding an opaque processing composition 17) so positioned as to discharge its contents between said elements upon suitable application of pressure, as by passing through a pair of pressure-applying rolls or other pressure means (not shown). Photosensitive element 30 comprises an opaque support 10 carrying a layer 12 of a dye developer over which has been coated a silver halide emulsion layer 14. The image-receiving element 32 comprises a transparent support 24 carrying, in turn, a polymeric acid layer 22, a spacer layer 20 and an image-receiving layer 18. An anti-reflection coating 26 is present on the outer surface of the transparent support 24. Photoexposure of the silver halide emulsion layer is effected through the anti-reflection coating 26 and the transparent support 24 and the layers carried thereon, i.e., the polymeric acid layer 22, the spacer layer 20 and the image-receiving layer 18 which layers are also transparent, the film unit being so positioned within the camera that light admitted through the camera exposure or lens system is incident upon the outer surface of the anti-reflection cōating 26. After exposure the film unit is advanced between suitable pressure-applying members, rupturing the container 16, thereby releasing and distributing a layer 17*a* of the opaque processing composition between the photosensitive element 30 and the image-receiving element 32. The opaque processing composition contains a film-forming polymer, a white pigment and has an initial pH at which one or more optical filter agents contained therein are colored; the optical filter agent (agents) is (are) to exhibit light absorption over at least a portion of the wavelength range of light actinic to the silver halide emulsion. As a result, ambient or environment light within that wavelength range incident upon transparent support 24 and transmitted through said transparent support and the transparent layers carried thereon in the direction of the photoexposed silver halide emulsion 14*a* is absorbed thereby avoiding further exposure of the photoexposed and developing silver halide emulsion 14*a*. In exposed and developed areas, the dye developer is oxidized as a function of the silver halide development and immobilized. Unoxidized dye developer associated with undeveloped and partially developed areas remains mobile and is transferred imagewise to the image-receiving layer 18 to provide the desired positive image therein. Permeation of the alkaline processing composition through the image-receiving layer 18 and the spacer layer 20 to the polymeric acid layer 22 is so controlled that the process pH is maintained at a high enough level to effect the requisite development and image transfer and to retain the optical filter agent (agents) in colored form, after which pH reduction effected as a result of alkali permeation into the polymeric acid layer 22 is effective to reduce the pH to a level which "discharges" the optical filter agent, i.e., changes it to a colorless form. Absorption of the water from the applied layer 17*a* of the processing composition results in a solidified film composed of the film-forming polymer and the white pigment dispersed therein, thus providing the reflecting layer 17*b* which also serves to laminate together the photosensitive element 30 and the image-receiving element 32 to provide the final laminate (Stage C). The positive transfer image in dye developer present in the image-receiving layer 18*a* is viewed through the transparent support 24 and the intermediate transparent layers against the reflecting layer 17*b* which provides an essentially white background for the dye image and also effectively masks from view the developed silver halide emulsion 14*b* and dye developer immobilized therein or remaining in the dye developer layer 12.

The optical filter agent is retained within the final film unit laminate and is preferably colorless in its final form, i.e., exhibiting no visible absorption to degrade the transfer image or the white background therefor provided by the reflecting layer 17*b*. The optical filter agent may be retained in the reflecting layer under these conditions, and it may contain a suitable "anchor" or "ballast" group to prevent its diffusion into adjacent layers. Alternatively, if the optical filter agent is initially diffusible, it may be selectively immobilized on th silver halide emulsion side of the reflecting layer 17*b*, e.g., by a mordant coated on the surface of the silver halide emulsion layer 14; in this embodiment the optical filter in its final state may be colorless or colored so long as any color exhibited by it is effectively masked by the reflecting layer 17*b*.

The reflecting layer provided in the embodiment shown in FIG. 1 is formed by solidification of a stratum of pigmented processing composition distribution after exposure. One may also provide a preformed pigmented layer, e.g., coated over the image-receiving layer 18, and effect photoexposure therethrough, in accordance with the teachings of U.S. Pat. No. 3,615,421 issued Oct. 26, 1971 to Edwin H. Land.

In the embodiment illustrated in FIG. 4, photoexposure is effected through the image-receiving element. While this is a particularly useful and preferred embodiment, it will be understood that the image-receiving element may be intially positioned out of the exposure path and superposed upon the photosensitive element after photoexposure, in which event the processing and final image stages would be the same as in FIG. 4.

In the embodiment illustrated in FIG. 4, photoexposure and viewing of the final image both are effected through the transparent support 24. Accordingly, the advantages of the anti-reflection coating 26 are obtained twice, i.e., first, by minimizing failure of the film unit to record light passed by the camera lens and second, by minimizing glare during viewing.

It will be noted in the embodiment illustrated in FIG. 4 that the image-viewing layer 18 is temporarily bonded to the silver halide emulsion layer 14 prior to exposure. The rupturable container or pod 16 is so positioned that upon its rupture the processing composition 17 will delaminate the film unit and distribute itself between the image-receiving layer 18 and the silver halide emulsion layer 14. The distributed layer of processing composition 17*a* ipon solidification forms a layer 17*b* which bonds the elements together to form the desired permanent laminate. Procedures for forming such prelaminated film units, i.e., film units in which the several elements are temporarily laminated together prior to exposure, are described, for example, in U.S. Pat. No. 3,625,281 issued to Albert J. Bachelder and Frederick J. Binda and in U.S. Pat. No. 3,652,282 to Edwin H. Land, both issued Mar. 28, 1972. A particularly useful and preferred prelamination utilizes a water-soluble polyethylene glycol.

The use of such temporarily laminated film units maximizes the beneficial effects obtained in the photoexposure stage from having the exposure effected through the anti-reflection coating 26, since the prelamination eliminates any other layer-to-air interface which could also reflect light and thus reduce the amount of light recorded by the photosensitive layer(s).

It will be recognized that the transfer image formed following exposure and processing of film units of the type illustrated in FIG. 4 will be geometrically reversed image of the subject. Accordingly, to provide geometrically nonreversed transfer images, exposure of such film units should be accomplished through an image reversing optical system, such as in a camera possessing an image reversing optical system utilizing mirror optics, e.g., as described in U.S. Pat. No. 3,447,437 issued June 3, 1969 to Douglas B. Tiffany. As noted above, when photoexposure is effected in such an image reversing optical system, photoexposure through an anti-reflection layer provides additional advantages in preventing the reflection of light which might cause the formation in the final image of a reflected or "ghost" image of one part of the photographed scene superposed upon another part of the scene.

Other film structures with which the transparent supports of this invention may be advantageously used, including films wherein photoexposure and viewing are effected from opposite sides, are described in our aforementioned copending application Ser. No. 276,979 to which reference may be made, and the specification of which is hereby incorporated by reference.

Processing of film units of the type described above is initiated by distributing the processing composition between predetermined layers of the film unit. In exposed and developed areas, the dye developer will be immobilized as a function of development. In unexposed and undeveloped areas, the dye developer is unreacted and diffusible, and this provides an imagewise distribution of unxoidized dye developer, diffusible in the processing composition, as a function of the point-to-point degree of exposure of the silver halide layer. The desired transfer image is obtained by the diffusion transfer to the image-receiving layer of at least part of this imagewise distribution of unoxidized dye developer. In the illustrated embodiment, the pH of the photographic system is controlled and reduced by the neutrilization of alkali after a predetermined interval, in accordance with the teachings of the above noted U.S. Pat. No. 3,615,644, to reduce the alkalinity to a pH at which the unoxidized dye developer is substantially insoluble and non-diffusible. As will be readily recognized, the details of such processes form no part of the present invention but are well known; the previously noted U.S. patents may be referred to for more specific discussion of such processes.

The film unit illustrated in FIG. 4 has, for convenience, been shown as a monochrome film. Multicolor images may be obtained by providing the requisite number of differentially exposable silver halide emulsions, and said silver halide emulsions are most commonly provided as individual layers coated in superposed relationship. Film units intended to provide multicolor images comprise two or more selectively sensitized silver halide layers each having associated therewith an appropriate image dye-providing material providing an image dye having spectral absorption characteristics substantially complementary to the light by which the associated silver halide is exposed. The most commonly employed negative components for forming multicolor images are of the "tripack" structure and contain blue-, green-, and red-sensitive silver halide layers each having associated therewith in the same or in a contiguous layer a yellow, a magenta and a cyan image dye-providing material respectively. Interlayers or spacer layers may, if desired, be provided between the respective silver halide layers and associated image dye-providing materials or between other layers. Integral multicolor photosensitive elements of this general type are disclosed in U.S. Pat. No. 3,345,163 issued Oct. 3, 1967 to Edwin H. Land and Howard G. Rogers as well as in the previously noted U.S. patents, e.g., in FIG. 9 of the aforementioned U.S. Pat. No. 2,983,606.

A number of modifications to the structures described in connection with the figures will readily suggest themselves to one skilled in the art. Thus, for example, the multicolor multilayer negative may be replaced by a screen-type negative as illustrated in U.S. Pat. No. 2,968,554 issued Jan. 17, 1961 to Edwin H. Land and in the aforementioned U.S. Pat. No. 2,983,606 particularly with respect to FIG. 3 thereof.

The image dye-providing materials which may be employed in such processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,774,668; 2,968,554; 2,983,606; 2,087,817; 3,185,567; 3,230,082; 3,345,163; and 3,443,943. As examples of initially non-diffusible materials and their use in color transfer systems, mention may be made of the materials and systems disclosed in U.S. Pat. Nos. 3,185,567; 3,443,939; 3,443,940; 3,227,550; and 3,227,552. Both types of image dye-providing substances and film units useful therewith also are discussed in the aforementioned U.S. Pat. No. 3,647,437 to which reference may be made.

It will be understood that dye transfer images which are neutral or black-and-white instead of monochrome or multicolor may be obtained by use of a single dye or a mixtue of dyes of the appropriate colors in proper proportions, the transfer of which may be controlled by a single layer of silver halide, in accordance with know techniques. It is also to be understood that "direct positive" silver halide emulsions may also be used, depending upon the particular image dye-providing substances employed and whether a positive or negative color transfer image is desired.

It will also be understood that the present invention may be utilized with films wherein the final image is in silver, and photoexposure and/or viewing is effected through a transparent support which may be provided with an anti-reflection coating in accordance with the teachings of this disclosure. The transfer of silver may be utilized to provide a silver image or to provide a dye image by silver dye bleaching processing. The invention may also be utilized with color and black-and-white, e.g., silver image, films which are developed by processes other than diffusion transfer.

Rupturable container 16 may be of the type shown and described in any of U.S. Pat. Nos. 2,543,181; 2,634,886; 3,653,732; 2,723,051; 3,056,492; 3,056,491; 3,152,515; and the like. In general, such containers will comprise a rectangular blank of fluid- and air-impervious sheet material folded longitudinally upon itself to form two walls which are sealed to one another along their longitudinal and end margins to form a cavity in which processing composition 17 is retained. The longitudinal marginal seal is made weaker than the end seals so as to become unsealed in response to the hydraulic pressure generated within the fluid contents 17 of the container by the application of compressive pressure to the walls of the container, e.g., by passing the film unit between opposed pressure applying rollers.

The rupturable container 16 is so positioned as to effect unidirectional discharge of the processing composition 17 between predetermined layers, e.g., the image-receiving layer 18 and the silver halide layer 14 next adjacent thereto, upon application of compressive force to the rupturable container 16. Thus, the rupturable container 16, as illustrated in FIG. 4, is fixedly positioned and extends transverse a leading edge of the prelaminated film unit with its longitudinal marginal seal directed toward the interface between the image-receiving layer 18 and the silver halide emulsion layer 14. The rupturable container 16 is fixedly secured to this laminate by a tape extending over a portion of one wall of the container, in combination with a separate retaining member or tape extending over a portion of the laminate's surface generally equal in area to about that covered by said tape.

A preferred opacification system to be contained in the processing composition 17 to effect processing outside of a camera is that described in the above-mentioned U.S. Pat. No. 3,647,437, and comprises a dispersion of an inorganic light-reflecting pigment which also contains at least one light-absorbing agent, i.e., optical filter agent, at a pH above the pKa of the optical filter agent in a concentration effective when the processing composition is applied, to provide a layer exhibiting optical transmission density > than about 6.0 density units with respect to incident radiation actinic to the photosensitive silver halide and optical reflection density < than about 1.0 density units with respect to incident visible radiation.

In liew of having the light-reflecting pigment in the processing composition, the light-reflecting pigment used to mask the photosensitive strata and to provide the background for viewing the color transfer image formed in the receiving layer may be present initially in whole or in part as a preformed layer in the film unit. As an example of such a preformed layer, mention may be made of that disclosed in U.S. pat. No. 3,615,421 issued Oct. 26, 1971 and in U.S. Pat. No. 3,620,724 issued Nov. 16, 1971, both in the name of Edwin H. Land. The reflecting agent may be generated in situ as is disclosed in U.S. Pat. Nos. 3,647,434 and 3,647,435, both issued Mar. 7, 1972 to Edwin H. Land.

The dye developers (or other image dye-providing substances) are preferably selected for their ability to provide colors that are useful in carrying out subtractive color photography, that is, the previously mentioned cyan, magenta and yellow. They may be incorporated in the respective silver halide emulsion or, in the preferred embodiment, in a separate layer behind the respective silver halide emulsion. Thus a dye developer may, for example, be in a coating or layer behind the respective silver halide emulsion and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

Dye developers, as noted above, are compounds which contain the chromophoric system of a dye and also a silver halide developing function. By "a silver halide developing function" is meant a grouping adapted to develop exposed silver halide. A preferred silver halide development function is a hydroquinoyl group. Other suitable developing functions include ortho-dihydrozyphenyl and ortho-and para-amino substituted hydroxyphenyl groups. In general, the development function includes a benzenoid developing function, that is, an aromatic developing group which forms quinonoid or quinone substances when oxidized.

The image-receiving layer may comprise one of the materials known in the art, such as poly-vinyl alcohol, gelatin, etc. It may contain agents adapted to mordant or otherwise fix the transferred image dye(s). Preferred materials comprise polyvinyl alcohol or gelatin containing a dye mordant such as poly-4-vinylpyridine, as disclosed in U.S. Pat. No. 3,148,061, issued Sept. 8, 1964 to Howard C. Haas.

In the various color diffusion transfer systems which have previously been described, and which employ an aqueous alkaline processing fluid, it is well known to employ an acid-reacting reagent in a layer of the film unit to lower the environmental pH following substantial dye transfer in order to increase the image stability and/or to adjust the pH from the first pH at which the image dyes are diffusible to a second (lower) pH at which they are not. For example, the previously mentioned U.S. Pat. No. 3,415,644 discloses systems wherein the desired pH reduction may be effected by providing a polymeric acid layer adjacent the dyeable stratum. These polymeric acids may be polymers which contain acid groups, e.g., carboxylic acid and sulfonic acid groups, which are capable of forming salts with alkali metals or with organic bases; or potentially acid-yielding groups such as anhydrides or lactones. Preferably the acid polymer contains free carboxyl groups. Alternatively, the acid-reacting reagent may be in a layer adjacent to the silver halide most distant from the image-receiving layer, as disclosed in U.S. Pat. No. 3,573,043 is issued Mar. 30, 1971 to Edwin H. Land. Another system for providing an acid-reacting reagent is disclosed in U.S. pat. No. 3,576,625 issued Apr. 27, 1971 to Edwin H. Land.

An inert interlayer or spacer layer may be and is preferably disposed between the polymeric acid layer and the dyeable stratum in order to control or "time" the pH reduction so that it is not premature and interferes with the development process. Suitable spacer or "timing" layers for this purpose are described with particularity in U.S. Pat. Nos. 3,362,819; 3,419,389; 3,421,893; 3,455,686; and 3,575,701.

While the acid layer and associated spacer layer are preferably contained in the positive component employed in systems wherein the dyeable stratum and photosensitive strata are contained on separate supports, e.g., between the support for the receiving element and the dyeable stratum; or associated with the dyeable stratum in those integral film units, e.g., on the side of the dyeable stratum opposed from the negative components, they may, if desired, be associated with the photosensitive strata, as is disclosed, for example, in U.S. Pat. Nos. 3,362,821 and 3,573,043. In film units such as those described in the aforementioned U.S. Pat. Nos. 3,594,164 and 3,594,165, they also may be contained on the spreader sheet employed to facilitate application of the processing fluid.

As is now well known and illustrated, for example, in the previously cited patents, the liquid processing composition referred to for effecting multicolor diffusion transfer processes comprises at least an aqueous solution of an alkaline material, for example sodium hydroxide, potassium hydroxide, and the like, and preferably possessing a pH in excessof 122, and most preferably includes a viscosity-increasing compound constituting a film-forming material of the type which, when the composition is spread and dried, forms a relatively firm and relatively stable film. The preferred film-forming materials comprise high molecular weight polymers such as polymeric, water-soluble ethers which are inert to an alkaline solution such as, for example, a hydroxyethyl cellulose or sodium carboxymethyl cellulose. Other film-forming materials or thickening agents whose ability to increase viscosity is substantially unaffected if left in solution for a long period of time also are capable of utilization. The film-forming material is preferably contained in the processing composition in such suitable quantities as to impart to the composition of viscosity in excess of 100 cps, at a temperature of approximately 24° C. and preferably in the order of 100,000 cps. to 200,000 cps. at that temperature.

In particularly useful embodiments of this invention, the transparent high index polymeric film contains a small quantity of a pigment, e.g., carbon black, to prevent fog formation due to light-piping by internal reflection within the transparent support, and subsequent exiting from the support surface carrying the photographic layers, of actinic light incident upon an edge thereof; such elements are described in Belgian Pat. No. 777,407. The transparent support advantageously may include an ultraviolet light absorber.

The above discussion of anti-reflection coatings has been in terms of coatings a quarter wavelength thick. Generally speaking, the anti-reflection coating will have an optical thickness in the range of from about 0.08 to about 0.2 micron and more preferably from about 0.12 to about 0.15 micron, or a preferred physical thickness of about 0.08 to about 0.11 micron.

Many fluorinated polymers suitable for use in the anti-reflection coatings of this invention are known in the art. The fluorinated polymer should be compatible with and exhibit sufficient adhesion to the transparent support to withstand the anticipated handling of the film unit, and this may be determined by routine testing.

The optimum index of refraction to be exhibited by the anti-reflection coating may be readily calculated by the principles of physics previously discussed, but it is not essential that such optimum value be used in order to obtain very beneficial results. In accordance with this invention, the transparent support is formed of a polymer having a high index of refraction, e.g., of at least 1.6 or higher and the anti-reflection coating preferably has an index of refraction at least 0.20 less than, and more preferably at least 0.25 to 0.3 less than, the index of refraction of the transparent support. The preferred anti-reflection coatings will exhibit an index of refraction of about 1.3 to 1.45, more preferably about 1.35 to 1.40.

As noted above, the anti-reflection coatings comprise a fluorinated polymer. Examples of such fluorinated polymers include perfluorinated polyolefins having an index of refraction of about 1.35 to about 1.45, e.g., polytetrafluoroethylene, such as disclosed in U.S. Pat. No. 3,617,354. As pointed out in said patent, such anti-reflection coatings may be applied by coating from a solvent, by vacuum deposition of the polymer, by polymerization in place of the corresponding monomer, etc.

Other fluorinated polymers which provide anti-reflection coatings include poly-(1,1-dihydropentadecafluoro-octyl acrylate) with an index of refraction of about 1.38; poly - (1,1-dihydropentadecafluro-octyl methacrylate) with an index of refraction of about 1.38; and

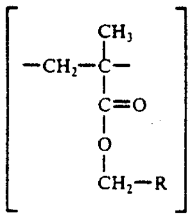

wherein R is perfluoro-cyclohexyl ($-C_6F_{11}$); Kynar 7201 (tradename of Pennwalt Chemical Co. for a copolymer of vinylidene fluoride and tetrafluoroethylene); Kel F Elastomer 3700 (tradename of 3M Company for a 50/50 copolymer of vinylidene fluoride; dehydrofluorinated polyvinylene fluoride; Fluoropolymer B (tradename of E. I. du Pont de Nemours for a 70/20/10 copolymer of vinylidene fluoride, tetrafluoroethylene and vinylbutyrate) and Vitron A (tradename of E. I. du Pont de Nemours for a 30/70 copolymer of hexafluoro propylene and vinylidene fluoride). Vinylidene fluoride polymers and copolymers are particularly useful. Other suitable fluorinated polymers for use in anti-reflection coatings may be readily selected by routine testing.

In accordance with this invention, it has been found that improved fluorinated polymer anti-reflection coatings may be obtained by including a dimethyl siloxane polymer in the coating composition. The addition of the dimethyl siloxane polymer gives more uniform coatings, and increases the abrasion resistance of the fluorinated polymer anti-reflection coating to polyester supports.

The dimethyl siloxane polymers contemplated for use in the practice of this invention are fluids and have repeating units of the structure

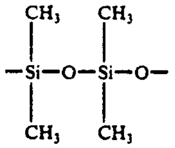

The polydimethyl siloxanes have an index of refraction very close to that of the fluorinated polymers particularly useful as anti-reflection coatings. Suitable polydimethyl siloxane polymers are those available from Dow Corning Corp., Midland, Michigan, under the tradename "Dow Corning 200 Fluid" as fluids having viscosities varying from 0.65 to 100,000 centistokes. The polydimethyl siloxane polymer may also be used in the form of a paste containing finely divided silica, such as that sold by Dow Corning Corp. as "Dow Corning Stop Cock Grease".

Indeed, the beneficial properties imparted to the fluorinated polymer anti-reflection coating was discovered when it was found that coating solutions which gave more uniform coatings than other coating solution were "contaminated" with stock cock grease. The ensuing investigation identified the polydimethyl siloxane component of the stop cock grease as being responsible for the improved coating properties. It was further found that the silica contained in the stop cock grease was not detrimental but, in combination with the polydimethyl siloxane, also was beneficial.

The polydimethyl siloxane is added to the fluorinated polymer coating solution in a quantity approximately 0.2 to 4.0% and preferably 0.5 to 3.0%, by weight of the total solids in the coating solution. The quantity of polydimethyl siloxane appropriate for any particular fluorinated polymer coating composition may be determined by routine experimentation. The polydimethyl siloxanes are soluble in solvents useful in coating fluorinated polymers and give homogeneous coatings with fluorinated polymers. If silica is present, as in the stop cock grease used in the preferred embodiment of the invention, it must be less than 100 mμ in diameter and sufficiently small so as not to interfere with obtaining smooth coatings as thin as a quarter wave.

The polydimethyl siloxanes also have been found to reduce the coefficient of friction of the fluorinated polymer anti-reflection coating.

The abrasion resistance and/or adhesion of fluorinated polymer anti-reflection layers carried by polyester supports may be increased, as disclosed and claimed in the copending application of Charles K. Chiklis, Ser. No. 354,008, filed Apr. 24, 1973 now U.S. Pat. No. 3,925,081 issued Dec. 9, 1975, by having an isocyanate included in the fluorinated polymer layer or disposed between the fluorinated polymer layer and the polyester support. The isocyanate is effective in quite small quantities and is effective with fluorinated polymers which are not cross-linked by the isocyanate. The preferred embodiments of the present invention include such use of an isocyanate. Some isocyanates, particularly at a given level, may provide improved abrasion resistance with limited or no increase in the adhesion to the polyester support.

The following examples further illustrate the preparation of transparent elements of this invention containing a polydimethyl siloxane to improve the properties of a fluorinated polymer anti-reflecting coating.

EXAMPLE I

A transparent 4 mil polyethylene terephthalate film base was coated with a solution comprising, by weight, 989.0 parts of methylpropyl ketone (dry), 6.05 parts of Kynar 7201 (tradename of Pennwalt Chemical Co. for a copolymer of vinylidene fluoride and tetrafluoroethylene), 3.30 parts of polymethyl methacrylate and 1.65 parts of Kel F Elastomer 3700 (tradename of 3M Company for a 50/50 copolymer of chlorotrifluoroethylene and vinylidene fluoride) to which was added 1.65 parts of Hylene M-50 and 0.09 parts of Dow Corning Stop Cock Grease. (Hylene M-50 is a trademark of E. I. duPont deNemours for a 50% by weight solution of undistilled methylene-bis-(4-phenyl-isocyanate) in monochlorobenzene.) This solution was coated at a coverage providing a dry coverage of about 15 mg./ft.$^2$ and an optical thickness of a quarter wave where the wavelength was approximately 550 nanometers to give a dry coverage of about 15 mg./ft.$^2$. This coating was dried at about 250° F. The resultant anti-reflection coating was markedly more uniform, as compared with a similar control coating which did not have the stop cock grease. Very good abrasion resistance was noted when the coating was rubbed vigorously with a dry tissue, such as a Kleenex brand facial tissue. (This abrasion test procedure has been found to be severe enough to cause scratching of uncoated polyethylene terephthalate.) The fluorinated polymer coating also exhibited excellent adhesion to the polyester in a cellophane tape adhesion test. (In this test, a cellophane tape such as that sold by 3M Company under the tradename "Scotch" tape is placed on the subject coating, rubbed about 20 to 30 times to insure uniform contact with the coating and then pulled off. This is considered to be a rather rigorous test of adhesion.)

EXAMPLE II

The procedure described in Example I was repeated substituting an equal part by weight of polydimethyl siloxane ("Dow Corning 200 Fluid", 10,000 centistokes viscosity), for the stop cock grease. The resulting anti-reflection coating exhibited comparable uniformity and physical properties.

EXAMPLE III

The procedure described in Example I was repeated, replacing the stop cock grease with 0.75 to 4.0 ml of "Dow Corning 200 Fluid" polydimethyl siloxanes of 10,000, 30,000, 60,000 and 100,000 centistokes viscosity per 750 g. of coating solution. In each instance, the anti-reflection coating exhibited comparable uniformity and physical properties.

As taught in said Ser. No. 354,008, a variety of isocyanates (aliphatic and aromatic) are useful to increase adhesion of fluorinated polymer layers to polyesters. Further details of such use of isocyanates may be found in said Ser. No. 354,008, which application is hereby incorporated by reference. The quantity of isocyanate used should not be so great as to adversely affect the index of refraction of the anti-reflection layer. In general, the isocyanate is used in a ratio of about 2.5 to 7.5 weight percent based upon polymer solids, and the polymer coating solution preferably contains about 1-2% solids. The solvents used in the coating solution should be "dry", i.e., substantially free of water, and otherwise non-reactive to avoid undesirable reactions with the isocyanate. (The methyl propyl ketone used in the above examples contained about 0.02 to 0.08% water, and this minute amount of water was not found to be detrimental.) Ketonic solvents are particularly useful.

While the beneficial properties obtained by including a polydimethyl siloxane have been illustrated in connection with a quarter wave fluorinated polymer coating, it will be understood that the polydimethyl siloxane is also advantageously employed in the eighth wave fluorinated polymer coatings used in combination with eighth wave silica coatings to provide anti-reflection coatings as described and claimed in the copending application of Edwin H. Land and Stanley M. Bloom, Ser. No. 311,831 filed Dec. 4, 1972, now U.S. Pat. No. 3,833,368.

Polyethylene terephthalate film bases coated with anti-reflection fluorinated polymer layers as described in the above Examples were used as supports for image-receiving elements of the type shown as element 32 in FIG. 4 and integral negative-positive multicolor reflection prints was prepared in accordance with the procedure described in Example 2 of Belgian Pat. No. 793,234. The general format of the resultant integral negative-positive reflection print was similar to that shown in FIG. 1 of the above-mentioned U.S. Pat. No. 3,415,644. Good anti-reflection properties were obtained.

In some instances, it has been found desirable to include a minor proportion of a non-fluorinated polymer, particularly an acrylic polymer such as polymethyl methacrylate, to improve the adhesion, scratch resistance or other properties of the fluorinated polymer. If such a non-fluorinated polymer is included, its proportion should not be so great as to undesirably increase the index of refraction of the fluorinated polymer coating; if, for example, it is desirable to include polymethyl methacrylate, it has been found that it may be present in up to about 30% weight percent of the polymer blend.

Although the above examples have utilized mixtures or blends of polymers in providing the fluorinated polymer anti-reflection layer, it should be understood that such mixtures are not necessary. Also, it should be understood that the proportions of the blended polymers may vary depending upon the properties desired of the final coating and upon the conditions and method of coating. Thus, for example, the Kynar 7201 may be used alone or in blends with polymethyl methacrylate in ratios, respectively, of 100–70% and 0–30% used in Example 4 may be varied over the range 0–25 parts Kel F Elastomer 3700, 100–45 parts Kynar 7201and 0–30 parts polymethyl methacrylate.

Other solvents found useful in coating such fluorinated polymers include Freon TF, trifluorobenzene and hexafluoro paraxylene. In general, it has been found useful to use coating solutions containing about 1-2% by weight of the polymer. It will be recognized by those skilled in the art that the solvent of choice for a particular polymer, and the concentration of the polymer in the coating solution, may be readily determined by routine experimentation. Obviously the solvent should be one which will not adversely affect, mechanically or optically, the transparent support upon which it is coated.

Application of the anti-reflection coating may be effected using a variety of well-known coating procedures, including drip coating, roll coating, slot coating, etc.

The transparent sheetlike elements of this invention advantageously may include a subbing layer to facilitate coating layers on the surface opposite that carrying the anti-reflection layer. Such subbing layers, e.g., gelatin, are well-known in the art. Alternatively, the film bases may be subjected to corona discharge or other treatments known in the art to facilitate coating on such film bases.

The transparent support advantageously has a moisture permeability rate adapted to accelerate "drying" of the layers forming the integral negative-positive reflection prints of the preferred embodiments. Reference may be made to U.S. Pat. No. 3,573,044 issued Mar. 30, 1971 to Edwin H. Land for a detailed description of dimensionally stable, transparent supports, e.g., microporous polyesters, having suitable permeability rates, and said description is hereby incorporated herein for convenience. It will be understood that selection of an anti-reflection coating should not adversely affect the desired moisture transmission rate of the transparent support(s).

The provision of an anti-friction coating provides a number of advantages. In the absence of the anti-reflection coating provided in accordance with this invention, the optimum angle for viewing an image through the transparent support is very specific and limited, if the viewer is to avoid to the maximum possible extent seeing specular reflection from the surface of the transparent support of light from the illumination source. The anti-reflection coating has been found to substantially reduce or prevent such specular reflection, thus greatly improving viewing. The resulting images exhibit, as shown above, increased color saturation and density and "cleaner" whites, i.e., reduced minimum densities. The avoidance of light loss during photoexposure is useful also in films wherein exposure is effected through a transparent support but the final image is separated and not viewed through a transparent support. The reduction in surface reflection (glare) simplifies copying integral negative-positive reflection prints of the type with which this invention is primarily concerned and aids in obtaining truer copy prints; light polarizers are customarily used to eliminate surface glare during copying. The anti-reflection coating may also provide anti-abrasion protection and, depending upon the polymer or other material used, desirable anti-friction properties to facilitate transport during manufacture and/or processing.

It is recognized that anti-reflection coatings have been used on photographic prints previously; e.g., U.S. Pat. No. 3,617,354 proposes to apply a layer of a polymerized perfluorinated olefin over the image-bearing photographic emulsion layer of a photographic print. The "photographic emulsion layer" referred to its customarily gelatin, and that patent acknowledges that only limited reduction of surface reflection is possible because such perfluorinated polyolefins do not have indices of refraction low enough to equal the ideal low index of about 1.23 required in view of gelatin's typical index of about 1.5. In contrast, the present invention applies the anti-reflection coating to a polymeric layer having a much higher index of refraction; the seeming disadvantage of such high indices of refraction as about 1.66 for a polyester transparent layer thus becomes a distinct advantage as the resulting "ideal" index of refraction for an anti-reflection coating becomes more practical to provide. For this reason, an anti-reflecting coating of a given "low" index of refraction will provide a greater reduction in glare and surface reflection from a high index polyester than from a lower index polymer such as cellulose acetate.

Furthermore, the teachings of the prior art as illustrated by said U.S. Pat. No. 3,617,354 require that the anti-reflection coating be applied after the final image is formed, to avoid interference with processing solutions or chemicals, e.g., by virtue of impermeability or low permeability to aqueous solutions as would be true of perfluorinated polyolefin coatings. Other efforts to provide anti-reflection coatings by aftertreatment have resulted in coatings which reduce glare but also reduce density by virtue of a coating which is not optically continuous and/or not optically clear.

It also is recognized that the use of silica to provide matte surfaces, thereby reducing glare, previously has been proposed. Such matte anti-reflection layers function by different principles, e.g. light-scattering, and are totally different in visual appearance and effect from the anti-reflection coatings of the present invention. Thus, for example, while a matte surface reduces glare it also reduces the visual color saturation of the image, and its presence is visually apparent. In contrast, the anti-reflection coating of the present invention is almost, if not completely, invisible, and it thus permits the color saturation of the image to be seen without the dilution introduced by either a glossy surface or a matte surface.

The product shown in FIG. 1 has utility apart from use as a photographic film support. One such use is as a protective sheet laminated, anti-reflection coating outermost, to the surface of a processed photographic image, e.g., a diffusion transfer image, in accordance with the teachings of U.S. Pat. No. 2,798,021 issued July 2, 1957 to Edwin H. Land. Another such use is to provide protective covers for notebook and photo album pages.

Where the expression "positive image" has been used, this expression should not be interpreted in a restrictive sense since it is used primarily for purposes of illustration, in that is defines the image produced on the image-carrying layer as being reversed, in the positive-negative sense, with respect to the image in the photosensitive emulsion layers. As an example of an alternative meaning for "positive image", assume that the photosensitive element is exposed to actinic light through a negative transparency. In this case, the latent image in the photosensitive emulsion layers will be positive and the dye image produced on the image-carrying layer will be negative. The expression "positive image" is intended to cover such an image produced on the image-carrying layer, as well as transfer images obtained by use of direct positive silver halide emulsions to provide a "positive" image of the photographed subject.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A transparent element comprising a polymeric film base having an index of refraction of at least 1.6, said polymeric film base carrying on one surface thereof a quarter-wave anti-reflection coating having an index of refraction at least about 0.20 less than said polymeric film base and an optical thickness of about 0.08 to about 0.2 micron, said anti-reflection coating comprising a fluorinated polymer and a polydimethyl siloxane in a quantity approximately 0.2 to 4 percent by weight of said anti-reflection coating, said polydimethyl siloxane having a viscosity of about 10,000 to 100,000 centistokes.

2. A transparent element as defined in claim 1 wherein said optical thickness is about 1400 Angstroms.

3. A transparent element as defined in claim 1 wherein the other surface of said polymeric film base carries a subbing layer.

4. A transparent element as defined in claim 1 wherein said polymeric film base is a polyester.

5. A transparent element as defined in claim 4 wherein said polyester is polyethylene terephthalate.

6. A transparent element as defined in claim 1 wherein said anti-reflection coating has an index of refraction of about 1.3 to 1.45.

7. A transparent element as defined in claim 1 wherein said polymeric film base has a thickness of about 2 to 11 mils.

8. A transparent element as defined in claim 1 wherein said anti-reflection coating includes a vinylidene fluoride copolymer.

9. A transparent element as defined in claim 1 wherein said anti-reflection coating includes a copolymer of vinylidene fluoride and chlorotrifluoroethylene.

10. A transparent element as defined in claim 1 wherein said anti-reflection coating includes a copolymer of vinylidene fluoride and tetrafluoroethylene.

11. A transparent element as defined in claim 1 wherein said anti-reflection coating includes a copolymer of vinylidene fluoride and hexafluoropropylene.

12. A transparent element as defined in claim 1 wherein said anti-reflection coating includes polymethyl methacrylate.

13. A transparent element as defined in claim 1 wherein said anti-reflection coating has a physical thickness of about 0.9 to about 0.11 micron.

14. A transparent element as defined in claim 1 wherein said polydimethyl siloxane is present in said anti-reflection coating in a quantity approximately 0.5 to 3 percent by weight of said anti-reflection coating.

15. A transparent element as defined in claim 1 wherein said anti-reflection coating includes finely divided silica less than 100 mμ in diameter.

16. A transparent element comprising a polyethylene terephthalate film base, said film base carrying on one surface thereof an anti-reflection coating comprising a copolymer of vinylidene fluoride and including a polydimethyl siloxane, said anti-reflection coating having a quarter wave optical thickness, a physical thickness of about 0.9 to about 0.11 micron, and an index of refraction at least about 0.20 less than the index of refraction of said polyethylene terephthalate film base, said polydimethyl siloxane having a viscosity of about 10,000 to 100,000 centistokes and being present in a quantity approximately 0.2 to 4 percent by weight of said anti-reflection coating.

17. A transparent element as defined in claim 16 where said polyethylene terephthalate includes a small quantity of a pigment effective to control light-piping by internal reflection of light within said polyethylene terephthalate film base.

18. A transparent element as defined in claim 16 wherein said optical thickness is about 1400 Angstroms.

19. A transparent element as defined in claim 16 wherein said polydimethyl siloxane is present in said anti-reflection coating in a concentration of approximately 0.5 to 3 percent by weight of said anti-reflection coating.

20. A transparent element as defined in claim 16 wherein said anti-reflection coating includes finely divided silica less than 100 mμ in diameter.

21. A transparent element as defined in claim 16 wherein said anti-reflection coating includes a copolymer of vinylidene fluoride and chlorotrifluoroethylene.

22. A transparent element as defined in claim 16 wherein said anti-reflection coating includes a copolymer of vinylidene fluoride and tetrafluoroethylene.

* * * * *

UNITED STATES PATENT AND TRADEMARK OFFICE
CERTIFICATE OF CORRECTION

PATENT NO. : 4,047,804

DATED : September 13, 1977

INVENTOR(S) : Robert K. Stephens

It is certified that error appears in the above-identified patent and that said Letters Patent are hereby corrected as shown below:

Column 6, line 13, after "(are)" insert --selected--.

Column 6, line 15, "environment" should be --environmental--.

Column 11, line 63, "excessof 122" should be --excess of 12--.

Column 12, line 31, "0.08" should be --0.09--.

Column 13, line 15, after "of" insert --chlorotrifluoroethylene and--.

Column 16, line 31, "drip" should be --dip--.

Column 16, line 54, "anti-friction" should be --anti-reflection--.

Signed and Sealed this

*Eleventh* Day of *November 1980*

[SEAL]

*Attest:*

SIDNEY A. DIAMOND

*Attesting Officer* *Commissioner of Patents and Trademarks*